(12) United States Patent
Nolan

(10) Patent No.: US 7,635,248 B2
(45) Date of Patent: Dec. 22, 2009

(54) TRUCK BED ASSEMBLY WITH INTEGRAL PARTIAL SLIDING DECK WITH PIVOTING INCLINED TOWERS FOR RAISING AND LOWERING A SLIDING DECK

(75) Inventor: Michael H. Nolan, Effingham, IL (US)

(73) Assignee: Sidney Slide L.P., Effingham, IL (US)

( * ) Notice: Subject to any disclaimer, the term of this patent is extended or adjusted under 35 U.S.C. 154(b) by 0 days.

(21) Appl. No.: 12/219,330

(22) Filed: Jul. 21, 2008

(65) Prior Publication Data

US 2009/0026785 A1    Jan. 29, 2009

Related U.S. Application Data

(60) Provisional application No. 60/935,150, filed on Jul. 27, 2007.

(51) Int. Cl.
- *B65F 1/00* (2006.01)
- *B60P 1/02* (2006.01)
- *B66C 1/00* (2006.01)

(52) U.S. Cl. .................. 414/545; 414/495; 414/546; 414/718; 187/234; 187/244; 296/61

(58) Field of Classification Search .............. 187/226, 187/234, 243–244; 296/3, 61; 414/341, 414/540, 545, 556–557, 572, 635, 477–478, 414/495, 532, 536, 680; 293/118; 14/71.3, 14/71.7; 410/14, 24, 4, 6, 93

See application file for complete search history.

(56) References Cited

U.S. PATENT DOCUMENTS 1,369,011 A  *  2/1921   Ducondu ................. 414/540
1,537,396 A      5/1925   White (Continued)

FOREIGN PATENT DOCUMENTS

DE    1224203    9/1966
GB    587296     4/1947

(Continued)

*Primary Examiner*—Gregory W Adams
(74) *Attorney, Agent, or Firm*—Rader Fishman & Grauer PLLC

(57) ABSTRACT

A sliding deck for carrying loads in transit and both lifting or lowering the loads includes a spaced pair of pivoting outer tubular tower members having hydraulically operated cylinders interior to a pair of telescoping tubular inner members located interior to the outer tubular tower member in which the pivoting of the tower members is controlled about a pivot by a supporting hydraulically-operated cylinder. A friction-relieving feature for accommodating movement of the interior telescoping member may include a Teflon brand wear pad fixed on the inner surface of the fixed outer tubular tower member. Together, the fixed outer tubular member and the sliding interior tubular member form a pivoting tower-like support member at an incline relative to the truck bed. A sliding deck structure for carrying cargo is fixedly secured through slots in the pivoting outer tubular tower support members to the interior telescoping tubular members of the pair of support tower members so that when the interior hydraulic cylinder is actuated, cylinder pistons are extended causing the sliding deck assembly to slide down a path defined by slot channels along an exterior of the fixed outer support members from an upraised level to a ground level while maintaining the sliding deck at a zero degree to about a minus 15 degrees of inclination relative to the ground to maintain carrying the load on the sliding deck. Preferably, the angle of incline of the tower assembly is at an angle, such as up to about 45 degrees, to reduce the force necessary to lift the load on the sliding deck assembly, while at the same time permitting the deck to remain about level relative to the ground at a zero degree incline. The pivoting towers allow for up to a minus 15 degree angle for purposes of the rear edge of the sliding deck being made to reach the ground in a downward, sloped or slanted surface.

18 Claims, 13 Drawing Sheets

U.S. PATENT DOCUMENTS

| | | | |
|---|---|---|---|
| 1,953,056 A | | 3/1934 | Olen |
| 2,036,459 A | * | 4/1936 | Carter ..................... 118/500 |
| 2,049,614 A | | 8/1936 | Caste |
| 2,062,227 A | * | 11/1936 | Lambert .................... 414/422 |
| 2,234,255 A | | 3/1941 | Hunsaker |
| 2,236,371 A | | 3/1941 | Howland |
| 2,252,952 A | | 8/1941 | Park |
| 2,277,529 A | | 3/1942 | Richter |
| 2,418,494 A | | 4/1947 | Anthony et al. |
| 2,530,341 A | | 11/1950 | Satsky |
| 2,581,333 A | | 1/1952 | Winkler |
| 2,590,591 A | | 3/1952 | Winkler |
| 2,635,771 A | * | 4/1953 | Black ....................... 414/540 |
| 2,689,764 A | | 9/1954 | Park |
| 2,761,571 A | * | 9/1956 | Adams .................... 414/137.7 |
| 2,850,186 A | | 9/1958 | Zwight |
| 2,873,868 A | | 2/1959 | Kringlen |
| 3,011,664 A | | 12/1961 | Novotney |
| 3,035,720 A | | 5/1962 | Seizer |
| 3,142,396 A | * | 7/1964 | Pauley et al. ............... 414/812 |
| 3,174,634 A | * | 3/1965 | Peck ........................ 414/541 |
| 3,211,307 A | * | 10/1965 | Neaverson et al. ......... 414/539 |
| 3,275,170 A | | 9/1966 | MacRae et al |
| 3,688,649 A | | 9/1972 | Hostetler |
| 3,734,239 A | * | 5/1973 | Martin et al. ............... 187/243 |
| 3,865,265 A | * | 2/1975 | Brudi et al. ................ 414/635 |
| 3,885,685 A | * | 5/1975 | Montgomery et al. ...... 414/391 |
| 4,056,203 A | | 11/1977 | Meldahl et al. |
| 4,121,695 A | | 10/1978 | Carpenter |
| 4,540,329 A | | 9/1985 | Martin |
| 4,652,201 A | | 3/1987 | Boughton |
| 4,708,577 A | * | 11/1987 | Fratzke ..................... 414/635 |
| 4,741,661 A | | 5/1988 | Carey |
| 4,778,327 A | * | 10/1988 | Tufenkian et al. ........... 414/541 |
| 4,838,753 A | * | 6/1989 | Gehman et al. ............. 414/563 |
| 4,907,936 A | * | 3/1990 | Bourdage .................. 414/545 |
| 4,988,258 A | * | 1/1991 | Lutz et al. .................. 414/500 |
| 5,176,225 A | | 1/1993 | Nussbaum |
| 5,176,226 A | * | 1/1993 | Martin et al. ............... 187/242 |
| 5,273,337 A | * | 12/1993 | Herrmeyer ............... 296/24.45 |
| 5,332,345 A | | 7/1994 | Lillard |
| 5,676,507 A | | 10/1997 | Lugo |
| 6,027,290 A | | 2/2000 | Andre |
| 6,345,943 B1 | | 2/2002 | Lawson et al. |
| 7,182,396 B2 | * | 2/2007 | Taylor ..................... 296/182.1 |
| 2007/0031225 A1 | * | 2/2007 | Castorino .................. 414/462 |

FOREIGN PATENT DOCUMENTS

| | | |
|---|---|---|
| GB | 1090326 | 11/1967 |
| GB | 1202317 | 8/1970 |
| GB | 1 314 525 | 4/1973 |
| GB | 2252952 | 8/1992 |
| WO | WO-02/072385 | 9/2002 |

* cited by examiner

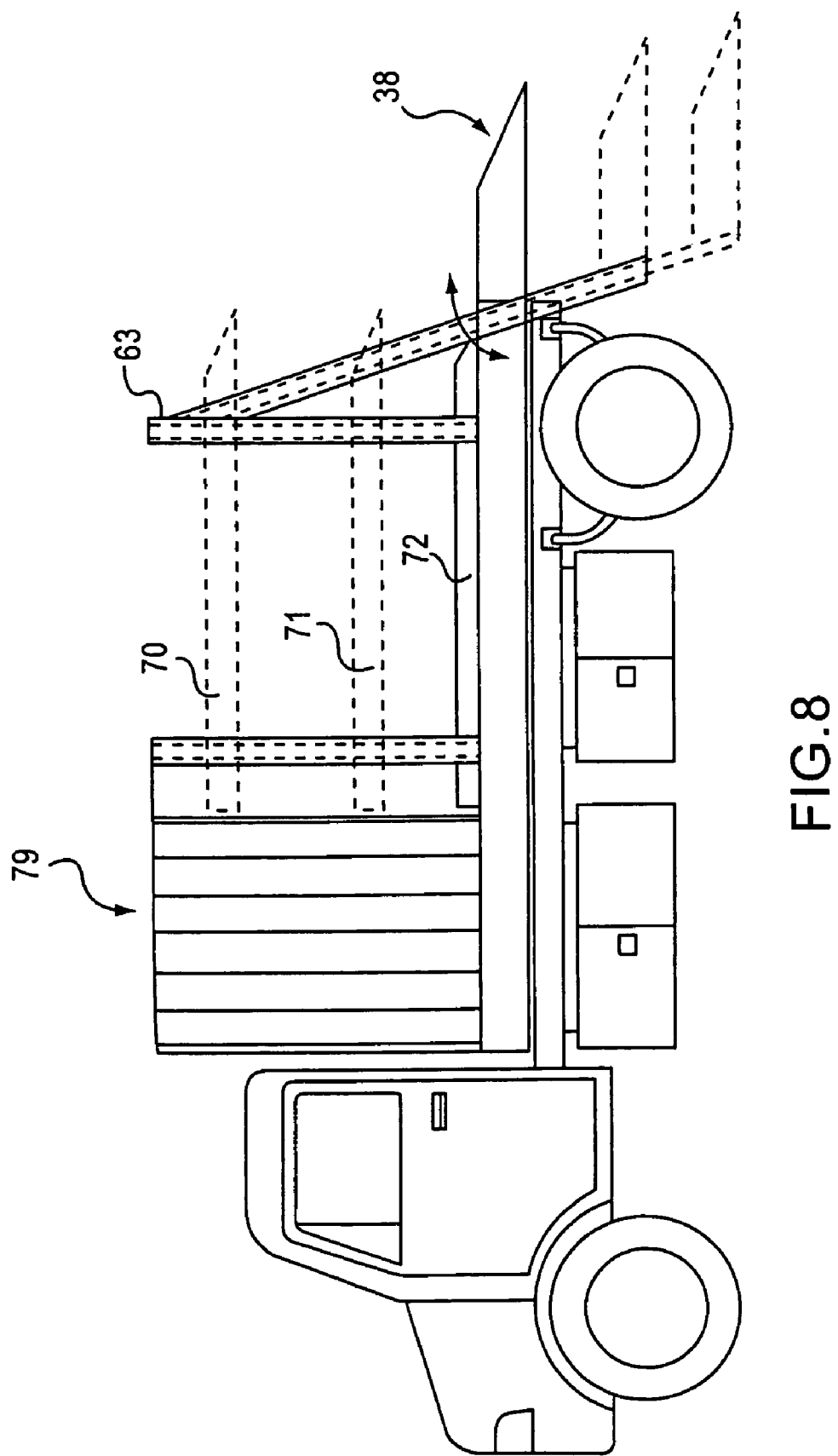

TRUCK BED ASSEMBLY WITH INTEGRAL PARTIAL SLIDING DECK WITH PIVOTING INCLINED TOWERS FOR RAISING AND LOWERING A SLIDING DECK

CROSS REFERENCE TO RELATED APPLICATIONS

This U.S. Utility patent application is related to the subject matter of U.S. provisional Application No. 60/935,150 filed on Jul. 27, 2007. The Applicant claims priority to the extent available for the subject matter of that provisional application as incorporated into or referred to in this U.S. utility patent application, and herein incorporates that disclosure by reference as if fully disclosed and repeated herein.

BACKGROUND OF THE INVENTION

This invention relates to a sliding deck as a rearward portion of a fixed deck of a flat truck bed in combination with a lowering mechanism for lowering the sliding deck from the fixed deck height to a ground level while maintaining the sliding deck at about a zero degree incline relative to a ground surface to about a minus 15% incline for loading and unloading. More particularly, this invention relates to such a load-bearing sliding deck as an OEM structure in combination with a fixed deck of the flat truck bed. Still more specifically, this invention relates to a sliding deck for carrying goods in transit at a raised level and lowering those goods to a lower or ground level by using tower members having pivoting outer tubular tower members cooperating with mating telescoping internal tubular tower members actuated by hydraulic cylinders located in the interior of the pivoting outer tubular tower members for moving the load-bearing deck upwardly or downwardly. Still more particularly, the sliding deck according to the invention includes a pair of inclined pivoting tower members supported for controlled pivoting by a supporting hydraulic cylinder causing pivoting, the tower members inclined at an angle relative to the truck bed and include a pivoting outer tubular tower member and a sliding interior tubular telescoping member controlled by a hydraulic cylinder contained in the interior of the pivoting inclined tower members and which effectively extends the area of the fixed deck of the truck by an amount defined by the sliding deck. Alternatively, the tower members could be fixed for limited applications on level ground.

DISCUSSION OF THE RELATED ART

Truck-based transport systems assume a myriad of forms responding to the commodity or goods being carried and transported. One well-known example of an open bed system for carrying goods for transport at a deck level is a flat truck bed. Conventionally, such flat truck bed systems must accommodate peripheral systems such as complementary fork lift operations for moving the goods from a ground level to a deck level on the flat truck bed, where those goods are secured for transport. There are known, in closed panel types of trucks for hauling packages, such as UPS trucks, or appliance delivery trucks, elevator systems generally vertically applied to the rear of a panel truck. Such elevator systems include a deck that is stowed within the confines of the panel truck, thus using valuable space, and do not permit loading until in place outside of the confines of the panel truck, thus becoming labor intensive. A deck on such a vertical elevator system generally is not designed for extending the deck area of the truck, or for carrying goods on the deck.

An example of a conventional lift for road vehicles is shown in U.K. Patent No. 1 314 525, (later referred to as the U.K. '525 patent publication) having a flap pivotally mounted on an edge of a lift platform that is movable between an upright position where it is locked and a generally horizontal down position. The lift has a pair of upright guides mounted on opposite sides of the open rear end, each of the upright guides receiving a hydraulic cylinder. A lift carriage is slidably mounted in each of the upright guides, the upper end of which is connected to a ram of the cylinder in that guide. This arrangement does not permit loads to be placed on the lift platform during transit, but rather only during ascent and descent of the platform, and the lift platform area does not add to the effective transporting area. In addition, the upright guides are vertical so that virtually the entire weight of the lift platform and its load are lifted by the cylinders.

It is also a general problem in the art of hauling goods or commodities to move a load from a deck level to a ground level safely and without back injuries to the user. That problem is particularly acute when hauling new or used auto parts because of the bulkiness and weight of the parts. Thus, an overall objective is to provide a convenient and user-friendly deck that effectively enlarges the usable area of a flat truck bed (whether or not enclosed), causes the goods to be carried on the deck itself so that additional labor in loading, unloading and then reloading the deck is avoided.

These and other shortcomings of the prior art that are addressed by the aft sliding deck in combination with a fixed forward deck of a truck will become apparent from a review of the drawings and the accompanying detailed description of the embodiments of the invention.

BRIEF SUMMARY OF THE INVENTION

Directed to overcoming problems in the art and providing a convenient, safe, user-friendly deck enhancement for flat bed trucks for hauling goods, the invention relates to a sliding deck assembly that is an integral part of a fixed truck bed at purchase. The deck assembly has both a fixed deck area in a forward area of the truck and the sliding deck of the invention at the aft end of the truck. Goods may be transported on the sliding deck as well as on the fixed deck. The sliding deck includes a spaced pair of pivoting outer tubular tower members having both hydraulically operated supporting cylinders and hydraulically operated extending/retracting cylinders interior to a pair of telescoping tubular inner members located interior to the outer tubular tower member. A friction-relieving feature for accommodating movement of the interior telescoping member relative to the pivoting member includes a Teflon brand wear pad fixed on the inner surface of the outer, pivoting, tubular member.

Together, the pivoting outer tubular member and the sliding interior tubular member form a tower-like support member pivoting at an incline relative to the truck bed. A sliding deck structure for carrying cargo is fixedly secured through slots in the outer tubular tower support members to the interior telescoping tubular members of the pair of support tower members so that when the interior hydraulic cylinder is actuated, cylinder pistons are extended causing the sliding deck assembly to slide down a path defined by slot channels along an exterior of the pivoting outer support members from an upraised level to a ground level while maintaining the sliding deck at a zero degree of inclination relative to the ground to maintain carrying the load on the sliding deck to about a minus 15 degrees relative to a horizontal reference. Preferably, the initial angle of incline of the tower assembly is at an angle, such as up to about 45 degrees, to reduce the force necessary to lift the load on the sliding deck assembly, while at the same time permitting the deck to remain about level relative to the ground at a zero degree incline.

The pivoting outer tubular members are mounted to the front fixed portion of the deck of the truck bed via pins, such as about 2 inch pins sized to accommodate the loads, using bushings mounted in brackets which are welded both to the fixed truck bed deck as well as to the outer tubular members. The pivoting outer inner and outer tubular members allow for a zero to about a minus 15 degree angle for loading and unloading goods on a sloped or slanted ground surface. The outer tubular tower members are actuated by spaced hydraulic cylinders rigidly mounted by pins and brackets to the outer top rails of the truck bed. By pivoting or tilting the towers in a rearward motion, the user is able to acquire up to about a minus 15 degree angle when encountering a change in the angle of the unloading or loading surface of the ground.

Longitudinal slots are provided in the pivoting exterior outer support channels of the tubular towers to permit the sliding deck to be secured to the interior telescoping member, preferably through supporting gussets to link the lifting deck of the sliding deck assembly to the interior telescoping member, and to assist in defining the path of descent.

A sliding deck assembly according to a main feature of the invention comprises the pair of opposed, pivoting side tower members having an outer pivoting tubular tower channel member and an inner telescoping tubular support member, a supporting hydraulic cylinder for supporting and rotationally moving the ends of the opposed tower members about a pivot, and a hydraulic cylinder interior to the inner telescoping tubular support member for extending or retracting the inner telescoping channel member relative to the outer tower member, the outer member defining a slot, and a sliding deck capable of being raised and lowered along a path defined by said slot, said sliding deck having at least a pair of longitudinally-extending sliding deck side members, each of said pair secured to said pivoting interior telescoping sliding tubular tower members.

Thus, the structure of the invention permits supporting a sliding deck assembly: (1) in a retracted, generally horizontal attitude as an extension of a flat truck bed; (2) a tilting downwardly of the sliding deck assembly while the tubular tower members remain in their original position (referred to herein as a "retracted, tilted down" position for the sliding deck; (3) an extended position of the deck caused by tilting of the tower members by actuation of the support cylinders, and (4) an extended, tilted down position for the sliding deck while the tubular members are extended by the support hydraulic cylinders.

A feature of the invention resides in that the sliding deck area is defined by the deck of the sliding deck assembly, so that the sliding deck area adds to the effective area of the deck of a truck bed. The sliding deck area is defined by the sliding deck, so that the sliding deck area is sufficiently strong to accommodate loads thereon while in transit, thus alleviating a need to always move the goods from the deck during transit.

Another aspect of the invention resides in that the sliding deck assembly is in further combination with a flat truck bed, and a pair of hydraulic support cylinders provided for supporting and moving the outer towers relative to the ground.

The sliding deck assembly may further include an automotive door rack located aft of a cab of said truck and forward of the supporting hydraulic cylinders which are connected to an upper portion of the each of the towers respectively. The sliding deck assembly may also further include, in combination with the truck bed, a plurality of generally horizontal racks supported at variably selected locations on a plurality of support posts at an area aft of said cab and forward of said slide assembly. The sliding deck assembly may further include a pair of rear deck corner gussets fixedly positioned between said side members of said rear deck and the interior telescoping slide channel member.

The sliding deck assembly further includes a retractable rear bumper, for crash protection, integrated in the bottom of the sliding deck assembly as a standard feature. As the sliding deck is lowered, the rear bumper retracts into the bottom of the slide deck. When the sliding deck is raised up, the rear bumper is extended back to a roadworthy position so that it will meet the necessary requirements to perform as a rear bumper. Also incorporated in the rear bumper is a pair of tail lights, stop lights, turn signal lights, and backup lights, as required by current US Department of Transportation standards.

Additional accessories may also be provided for the sliding deck assembly according to the invention. For example, a backstop member at the rear of the sliding deck, and side rails may be included on those portions of the sliding deck, as well as the fixed deck, facing the outside of the truck to constrain loads on the deck from accidental dismount. The hydraulic circuit for the hydraulic cylinders may be remotely actuated by a wireless controller to permit the user to remotely control raising or lowering the lifting gate of the sliding deck assembly.

These and other features of the invention will be seen from accompanying drawings and the detailed description of embodiments of the invention that follow.

BRIEF DESCRIPTION OF THE DRAWINGS

In the drawings:

FIG. 3 is a view of the sliding deck in an upraised position with the tubular members in their retracted position, wherein FIG. 3A is a perspective view of the same while

FIG. 4 is a view, similar to FIG. 3, of the sliding deck in a lowered position with the tubular members in their retracted position wherein FIG. 4A is a perspective view of the same while

FIG. 5 is a view, similar to FIG. 3, of the sliding deck in an upraised position with the tubular members in an extended position, wherein FIG. 5A is a perspective view of the same, while

FIG. 6 is a view, similar to FIG. 4, of the sliding deck in a lowered position with the tubular members in an extended position, wherein FIG. 6A is a perspective view of the same, while

FIG. 8 is a view similar to FIG. 7 showing the sliding deck according to the invention on the rear of the fixed bed of a truck, with an area closely adjacent the cab accommodating transversely-mounted storage areas for large, generally flat panels, such as automotive hoods and doors.

These and other features of the invention will be fully understood from a review of the detailed discussion of the embodiments of the invention which follows.

DETAILED DISCUSSION OF THE PREFERRED EMBODIMENTS

FIGS. 1 to 8 show in sufficient detail the components, assemblage, operation and conceptualization of several embodiments for the sliding deck assembly according to the invention for carrying products placed on the sliding deck of the sliding deck assembly and transported while on the sliding deck, and for moving those products so-located between a level at the flat bed of the flat bed truck and the ground. Those two levels are referred to in this description as a raised or upraised level and a lower or lowered level, controlled by actuation of a cylinder located within the confines of each side of the telescoping tubular members. The invention is further characterized in that the supporting towers for the sliding deck are pivotable between a retracted position and an extended position to provide a range of motion for the sliding deck from zero degrees to about a minus 15 degrees relative to a horizontal reference to provide additional flexibility for the invention when used on inclined or sloped surfaces.

Figure 1:
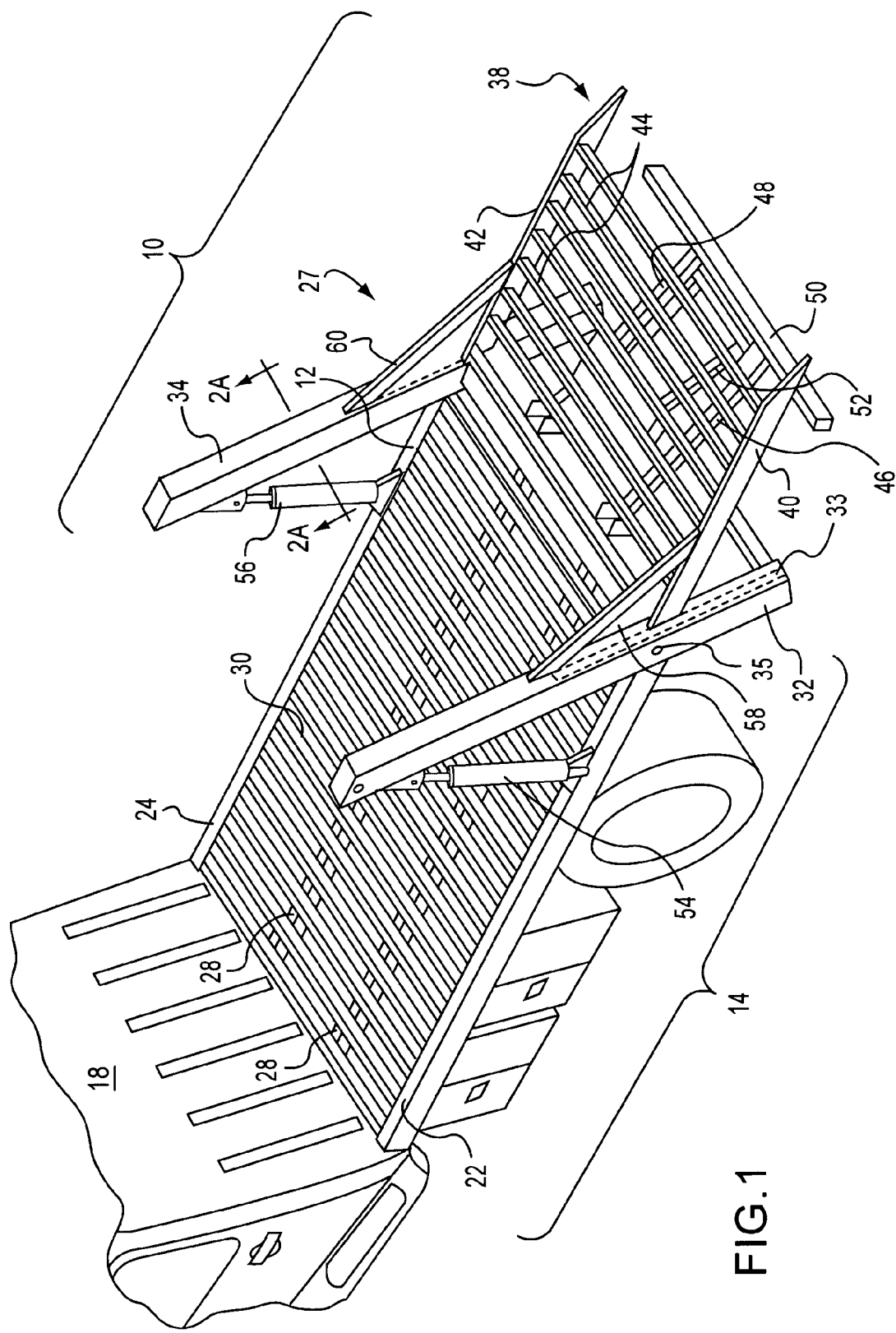
FIG. 1 is a perspective view of the sliding deck assembly according to the invention installed at a rearmost portion of the fixed bed of a flat truck bed thus extending the deck area of the fixed deck and showing the sliding deck in its upraised position with the towers in a retracted position.

FIG. 1 is a perspective view of the sliding deck assembly according to the invention installed at a rearmost portion of the fixed bed of a flat truck bed, thus extending the deck area of the fixed deck. As shown in FIG. 1, a sliding deck assembly 10 according to the invention is located at the rear end region 12 of the fixed truck bed assembly 14 of a flat truck bed having a cab 18 for a driver (not shown) at a forward end of the flat truck bed. The sliding deck assembly is pivotally secured to the fixed bed assembly 14 by conventional fastening techniques such as bolts and/or by welding.

As contemplated by the embodiment of FIG. 1, the sliding deck assembly 10 is provided as a part of and in combination with the fixed bed assembly 14 of the flat truck bed as a part of the OEM character of the truck.

A conventional flat truck bed includes a pair of opposed side channels 22, 24 extended longitudinally along the respective sides of the fixed bed assembly 14. Each of a pair of sub-frame channel members 26, 28 are longitudinally located between the opposed side channels 22, 24, for fixedly securing a spaced plurality of transversely located cross members 30. The members 26, 28 are placed generally equidistant to and parallel with the side channels 22, 24. The structure of the flat bed assembly 14 is sized and strengthened to receive loads, such as machinery, automobile parts and the like. In such an embodiment, the effective usable area of the flat bed assembly 14 is defined approximately by the opposite truck side channels 22, 24 and the foremost and aftmost cross members or struts 30. Thus, it is a feature of the invention that the sliding deck assembly provides a truck bed area in addition to the fixed bed assembly for accommodating goods without unloading.

The top surface of the deck area 14 and the deck area of the sliding deck 38 will be covered with a material such as steel or wood. Such a planar surface facilitates smooth sliding of products across the floor surface of each.

The sliding deck assembly includes a pivoting tower support assembly 27 made up of a pair of opposed pivoting, tubular tower members 32, 34 astride the side channels 22, 24 and secured to the side channels 22, 24 for pivoting movement such as by a bolt and bushing structure at each side for permitting pivoting of the tower members 32, 34 as will be further described in detail. Each of the pivoting tower members 32, 34 is supported by a hydraulic cylinder 54, 56 connected at a forward portion of each of the tubular members, or at its end for pivoting movement about the pins through a limited arc by extension and/or retraction of the supporting hydraulic supporting cylinders 54, 56.

The pivoting tubular tower members 32, 34 may preferably be mounted about pins on the outsides of the side channel members 22, 24, but alternative could be pivotable about the pins on the insides of the side channel members, or alternatively on either the inside or the outside.

The sliding deck 38 according to a main feature of the invention comprises the pair of opposed, pivoting tubular side tower members 32, 34 having outer supporting hydraulic cylinders 54, 56 and inner telescoping tubular support members 62, 64 and hydraulic cylinders 80 (FIG. 2B) interior to each of the inner telescoping tubular support members for extending or retracting the inner telescoping members 62, 64 (FIG. 2A) relative to the pivoting tubular outer tower members 32, 34. The outer members respectively define slots 33, and a sliding deck 38 capable of being raised and lowered along a path defined by the slots 33, 35 and including a path of movement of the tubular tower members 32, 34 (FIG. 1) when moved from the retracted position of FIG. 1 to an extended position as later shown and discussed.

The sliding deck 38 has at least a pair of longitudinally-extending fixed deck side members 40, 42, each of the pair secured to the interior telescoping sliding tubular tower members 62, 64.

It is a feature of the invention that the sliding deck 38 is raised or lowered along an inclined track defined by the respective pivoting tubular support members 32, 34 and extends rearward beyond the fixed deck defined by the fixed bed assembly 14 of the flat bed truck 16. With this construction, the effective load-bearing area of the flat bed is increased by the area defined by the area of the sliding deck. It is also a feature of the invention that the sliding deck is sized and structured to accommodate loads directly on the sliding deck 38 that are boxed, palletized or free-standing. According to the load accommodated, the sliding deck 38 may include hooks or tie-down rails to receive straps or banding from the goods for travel and for safety while in transit. It is another important feature of the invention that such goods, located on the sliding deck 38, may be retained at that location while the sliding deck 38 is raised or lowered, as shown in FIGS. 3A to 6B.

The sliding deck 38 of the invention includes a pair of opposed body side members 40, 42 having a plurality of transversely located bed members 44 spanning the space between the side members 40, 42 with a representative pair 46, 48 of longitudinally extending strut members for the sliding deck 38. A tail bar 50 (FIG. 1) is secured to the sliding deck to provide safety lighting including left and right turn signals, brake lights, and hazard lights, connected in a conventional manner with the lighting system of the truck 16 through a wiring harness 52.

The sliding deck assembly further includes a retractable rear bumper, for crash protection, integrated in the bottom of the sliding deck assembly as a standard feature. As the sliding deck 38 is lowered, the rear bumper retracts into the bottom of the slide deck. When the sliding deck is raised up, the rear bumper is extended back to a roadworthy position so that it will meet the necessary requirements to perform as a rear bumper. Also incorporated in the rear bumper is a pair of tail lights, stop lights, turn signal lights, and backup lights, as required by current US Department of Transportation standards.

Additional structure as accessories for the sliding deck assembly according to the invention include structure for a safety flap, and a roll off back stop.

As explained, a forward end of each of the pivoting tubular tower members 32, 34 is supported by and secured to a pair of supporting hydraulic cylinders 54, 56 for causing the tower members 32, 34 to pivot about the pins 35. Thus, according to the invention, the sliding deck 38 may be in an upraised position, with the tower member retracted as in FIGS. 1 and 3. Alternatively, the sliding deck may be moved to a lowered position or a position intermediate these two positions while the tower members remain retracted as in FIG. 4. Additionally, the sliding deck 38 may be moved while raised by extension of the tower members as shown in FIG. 5. Finally, the sliding deck may be located in a lowered position by extension of the sliding towers as shown in FIG. 6.

Another feature for structural integrity under loads is that an opposed pair 58, 60 of rear deck corner gussets are fixedly secured respectively to the slide channels 62, 64 and to the body side members 40, 42 of the sliding deck, such as by welding. The weldments are located so as not to interfere with the open slots 33, 35 on the side channels as the sliding deck is raised upwardly and downwardly.

The hydraulic cylinders positioned in the respective interiors of the side channels cooperating with the sliding deck are shown and discussed in greater detail in connection with FIG. 2B. It may be noted at this point in the discussion that the hydraulic conduits for conducting hydraulic fluid from the hydraulic supply of the flat bed truck 14 to the hydraulic cylinders within the interior of the side channels 32, 34.

Each of the slide tower support members 32, 34 (FIG. 1) includes a slot 33, 35 to accommodate the rigid connection between the front deck corner gusset and the interior telescoping member 62, 64 (FIG. 2A) of the slide channels 32, 34 (FIG. 1) respective and to define paths of descent and ascent for the sliding deck when operated. In effect, the sliding deck slides along a path defined by the slide channels with an extension or retraction of the interior telescoping members 62, 64 upon actuation and deactuation of the interior hydraulic cylinders 80 respectively. The sliding deck assembly can be operated by actuating each of the hydraulic cylinders 80 simultaneously.

A suitable hydraulic circuit for actuating the cylinders from the upright to the ground position and vice versa, and is capable of locking the hydraulic cylinder at points therebetween is provided according to the skill in this art.

Figure 2A:
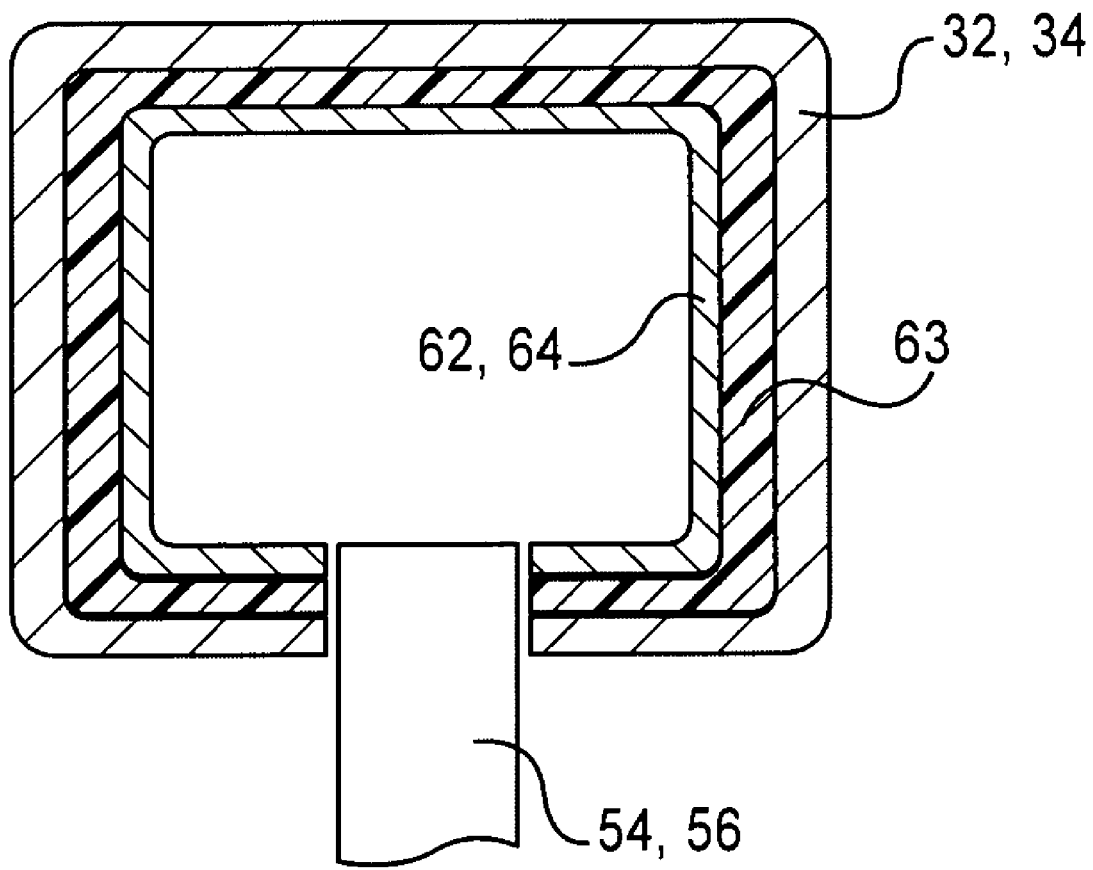
FIG. 2A is a cross section of the pivoting member of the tower assembly with a friction-reducing Teflon brand wear pad for the inner surface of the outer pivoting tubular member of the tower assembly to reduce friction when extending the interior tubular members of the tower members during extension of the sliding deck.

FIG. 2A is a more detailed perspective view of the telescoping tower assembly of the sliding deck according to the invention. As seen in cross section taken along line 2A of FIG. 1, the fixed outer tubular tower support member 32, 34 houses the interior telescoping tubular tower support member 62, 64 to which the gusset 54, 56 is fixed to operate as previously described. In order to reduce the friction between the outer members 32, 34 and the inner members 62, 64, a friction reducing member or wear pad 63 is applied to the inner surface of the fixed outer tubular tower members 32, 34. An example of the friction reducing member contemplated by this disclosure is a Teflon brand wear pad.

Figure 2B:
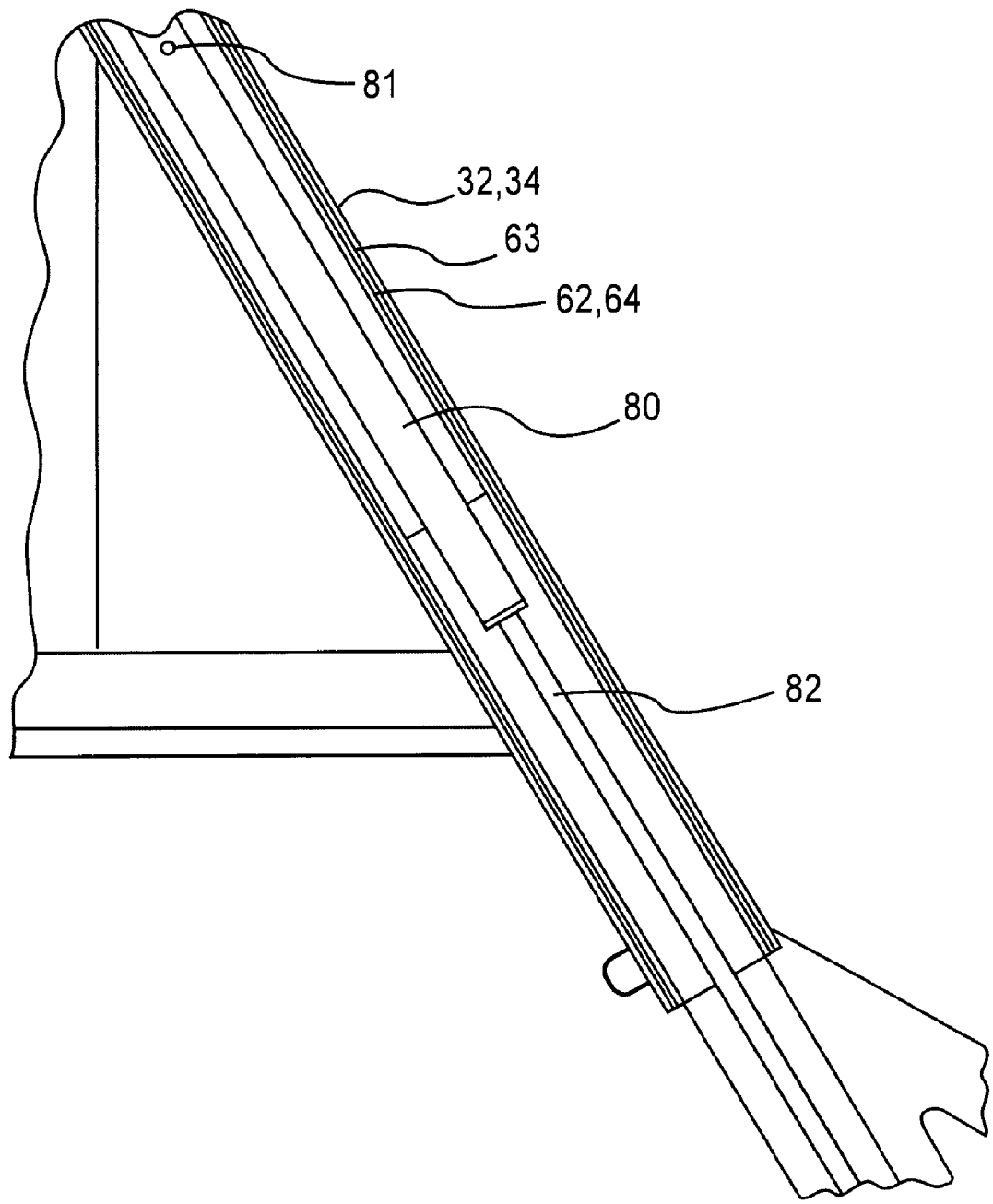
FIG. 2B is a cutaway view of one of the two tower assemblies showing the pivoting outer tubular tower member, the inner telescoping member, and connections for the hydraulic cylinder interior to the tower assembly.

FIG. 2B is a cutaway view of the outer, tubular, pivoting support members 32, 34 having a connector member 81 located at a top portion thereof, to which is connected a push rod 82 of a hydraulic cylinder 80 as shown on the interior of the two assembly. The cylinder, when actuated, causes its push rod 82 to extend to drive the inner telescoping member 62, 64, thus causing the deck 38 to lower.

Figure 3A:
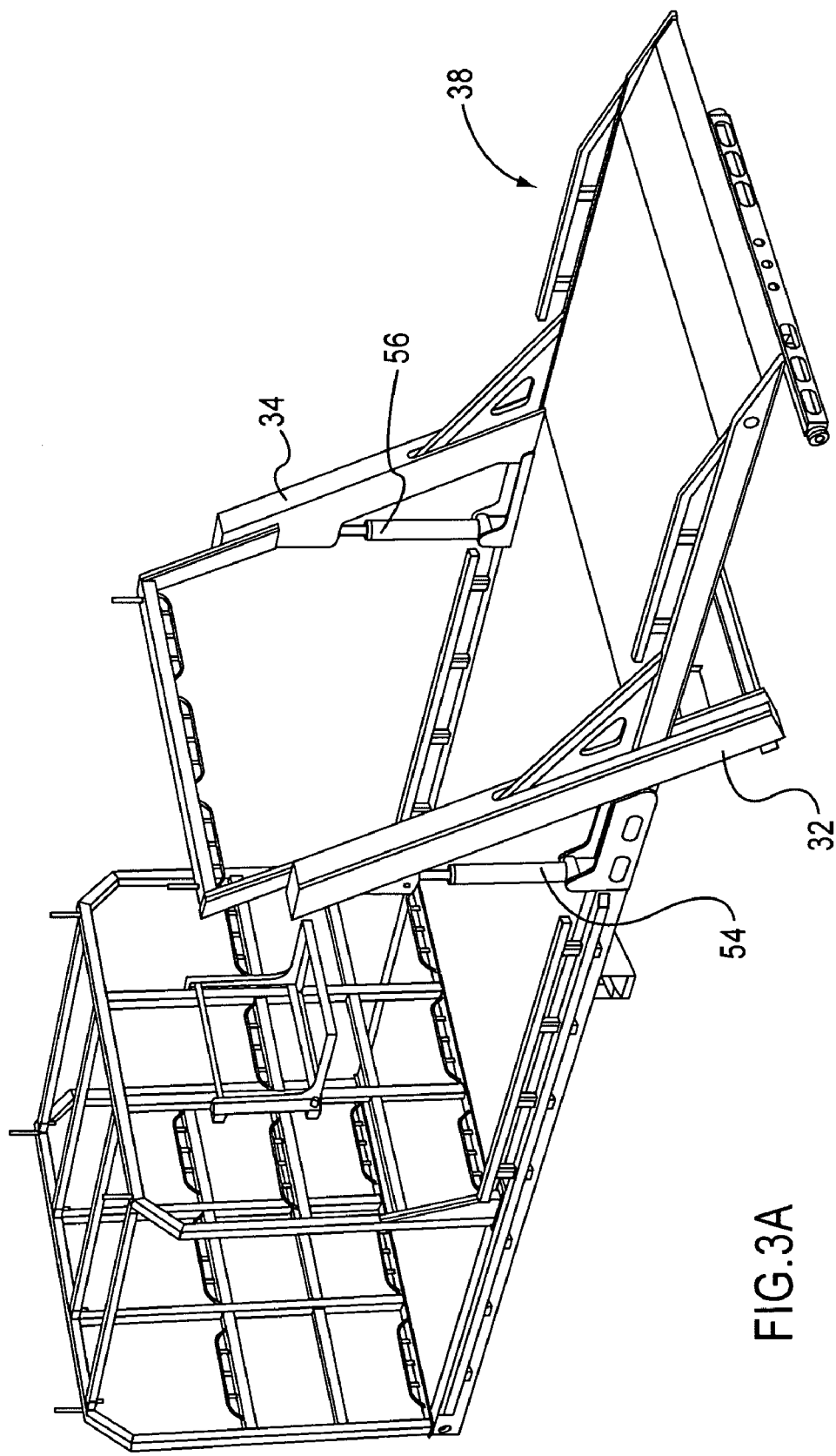
Figure 3B:
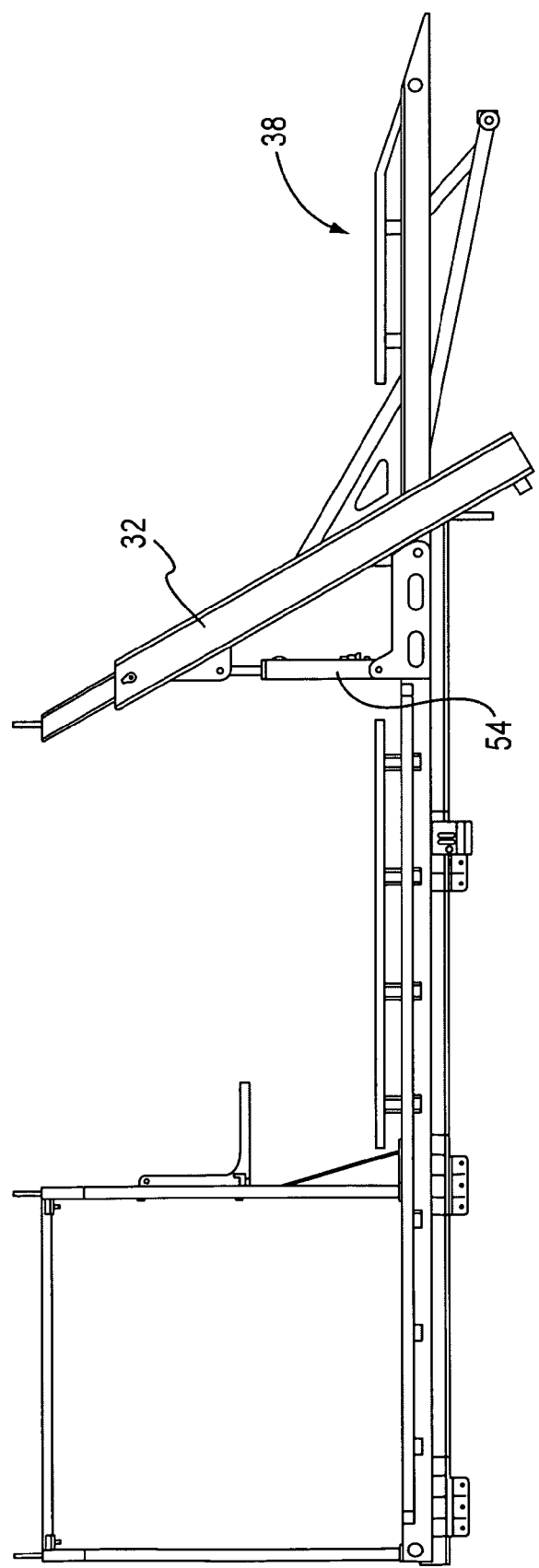
FIG. 3B shows a diagrammatic side view of the same.
Figure 4A:
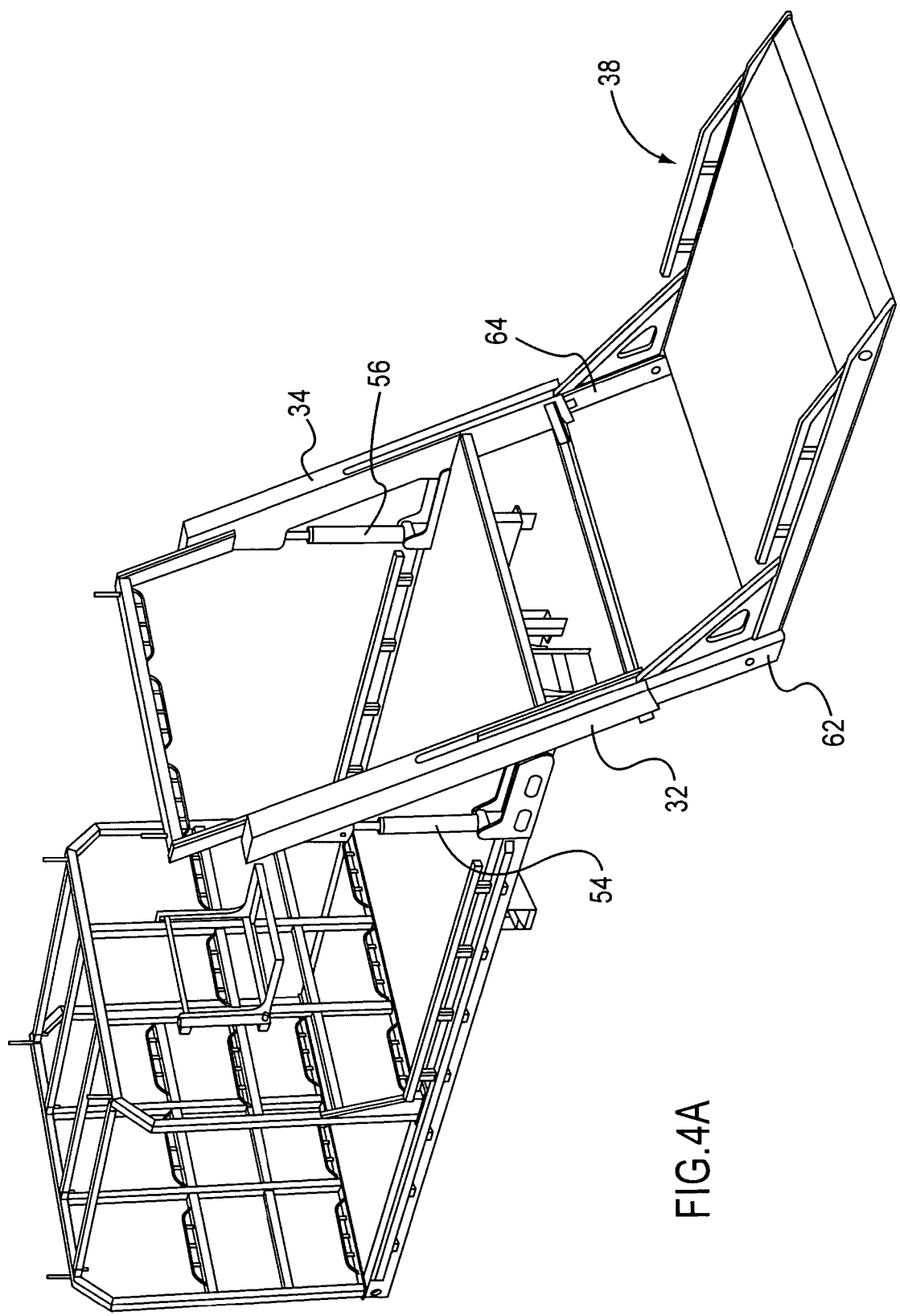
Figure 4B:
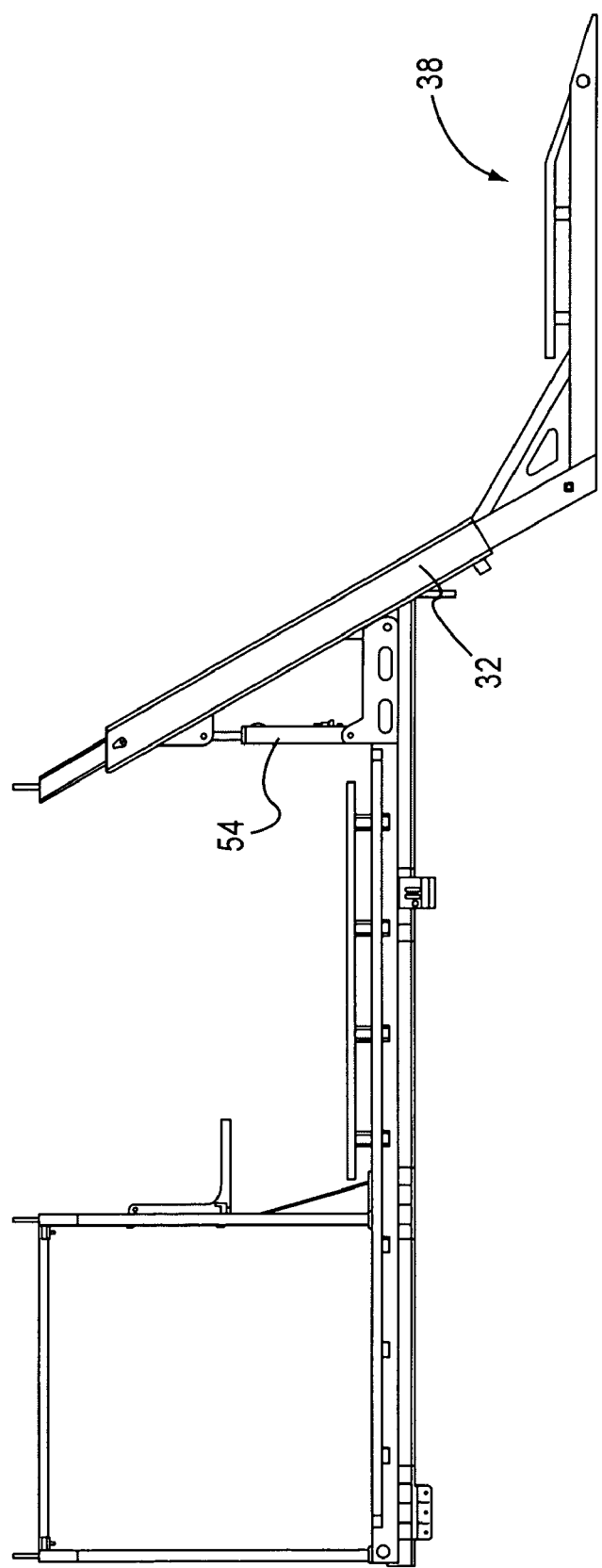
FIG. 4B shows a diagrammatic side view of the same.
Figure 5A:
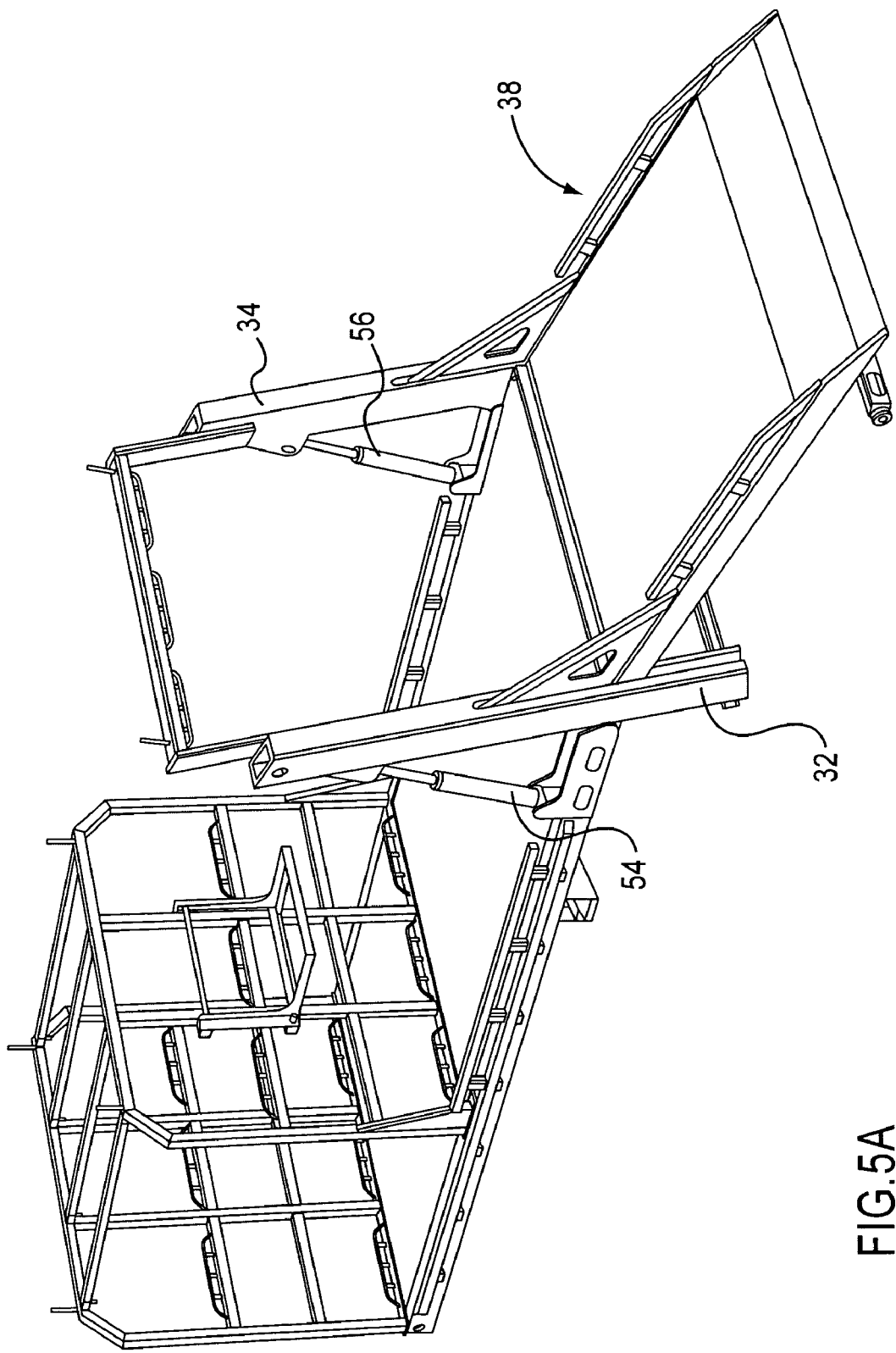
Figure 5B:
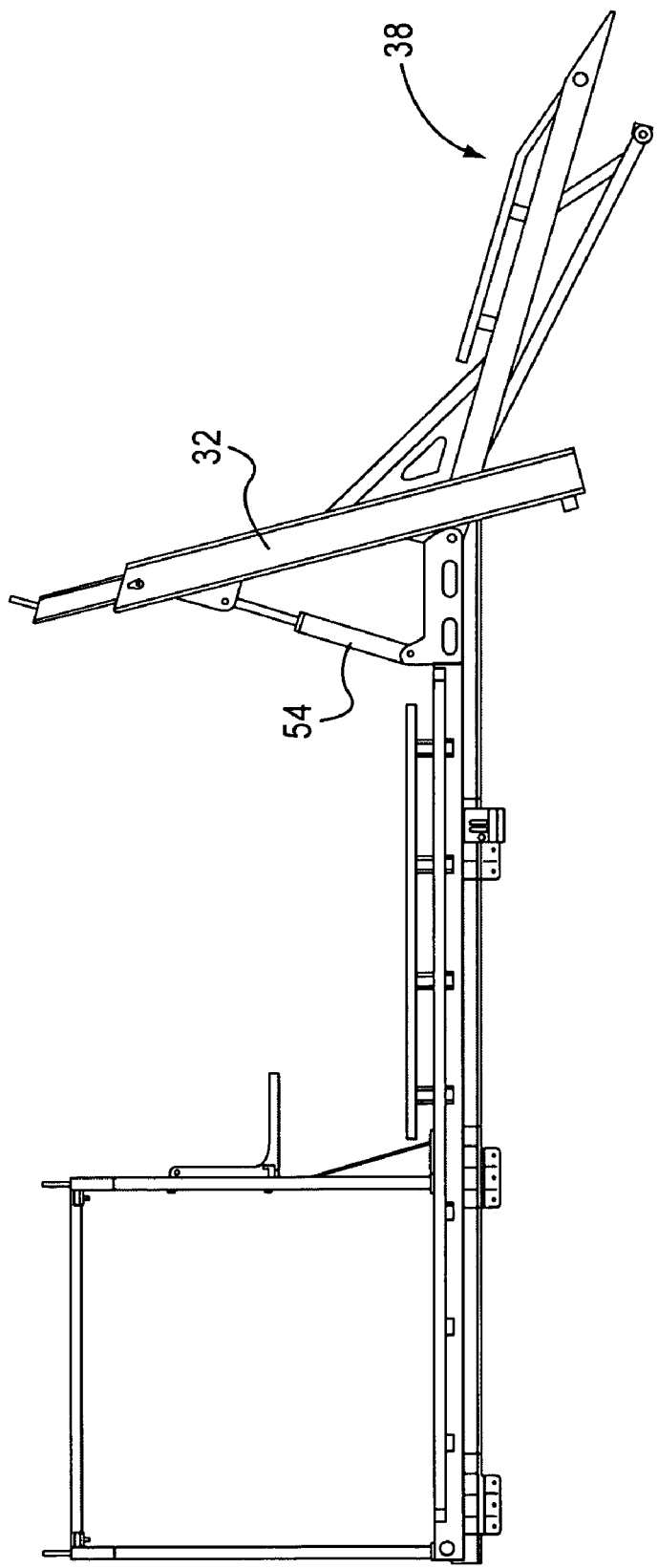
FIG. 5B shows a diagrammatic side view of the same.
Figure 6A:
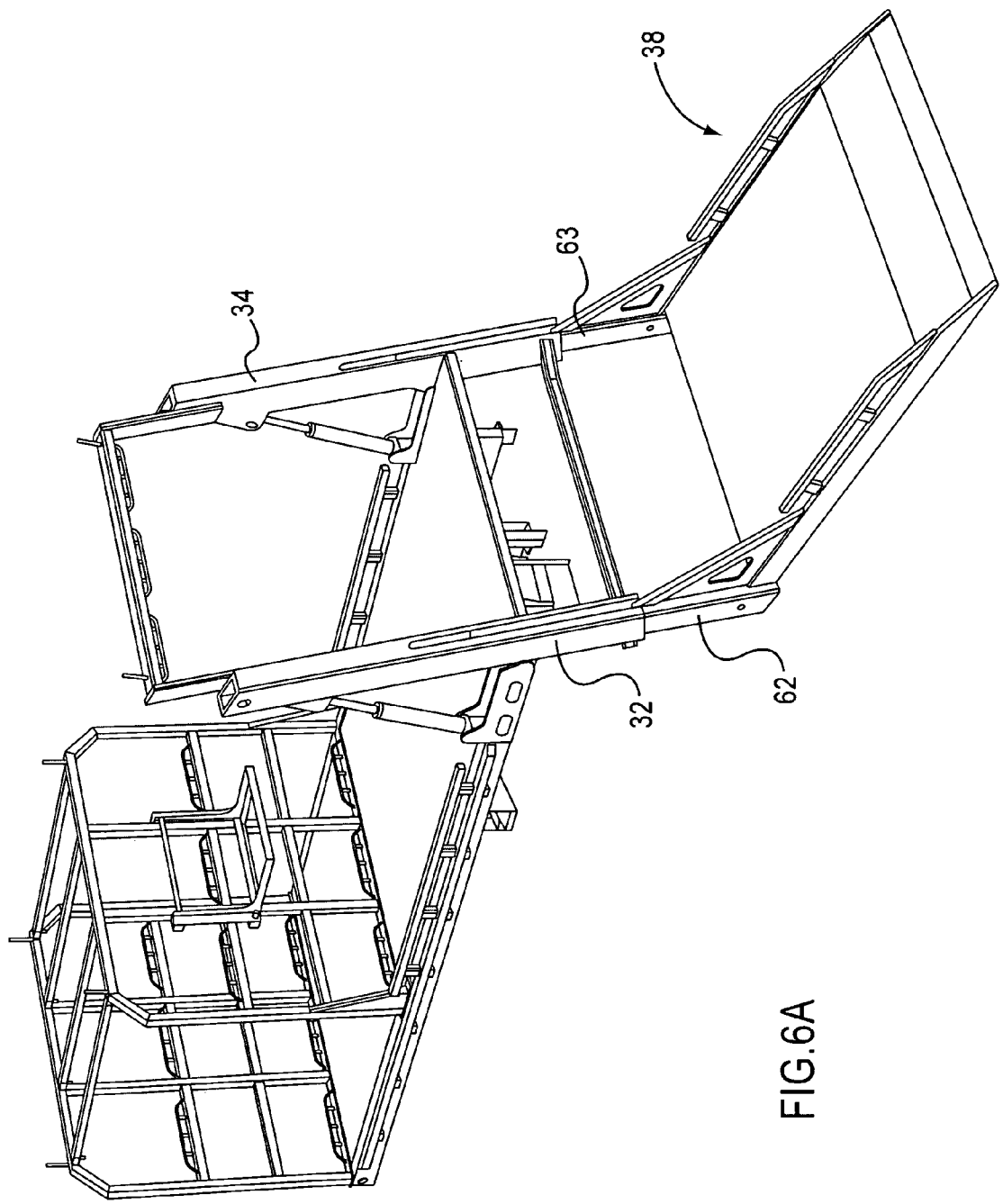
Figure 6B:
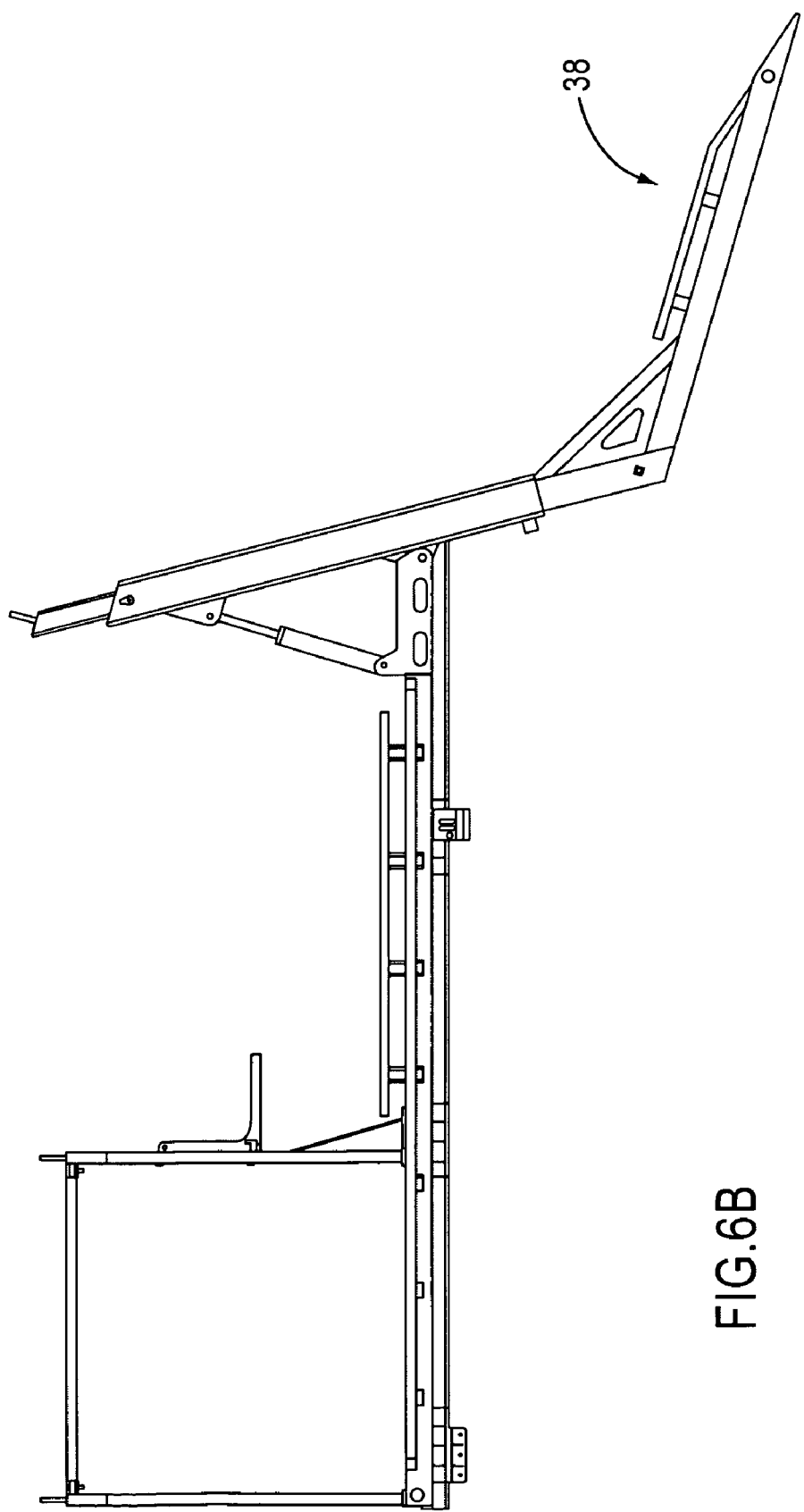
FIG. 6B shows a diagrammatic side view of the same.

FIGS. 3 to 6 diagrammatically contrast the positions of the sliding deck 38 between an upraised position as shown in FIG. 3 and a lowered position as shown in FIG. 4, each for retracted tubular members, and between the sliding deck 38 shown in its upraised position in FIG. 5 and its lowered position in FIG. 6, each for tubular members in the extended position. Controls for providing signals to accomplish the actuation of the hydraulic cylinders in the interiors of the side channels or the supporting hydraulic cylinders are conventional and include safety interlocks. Those controls are preferably also responsive to a remote controller.

Figure 7:
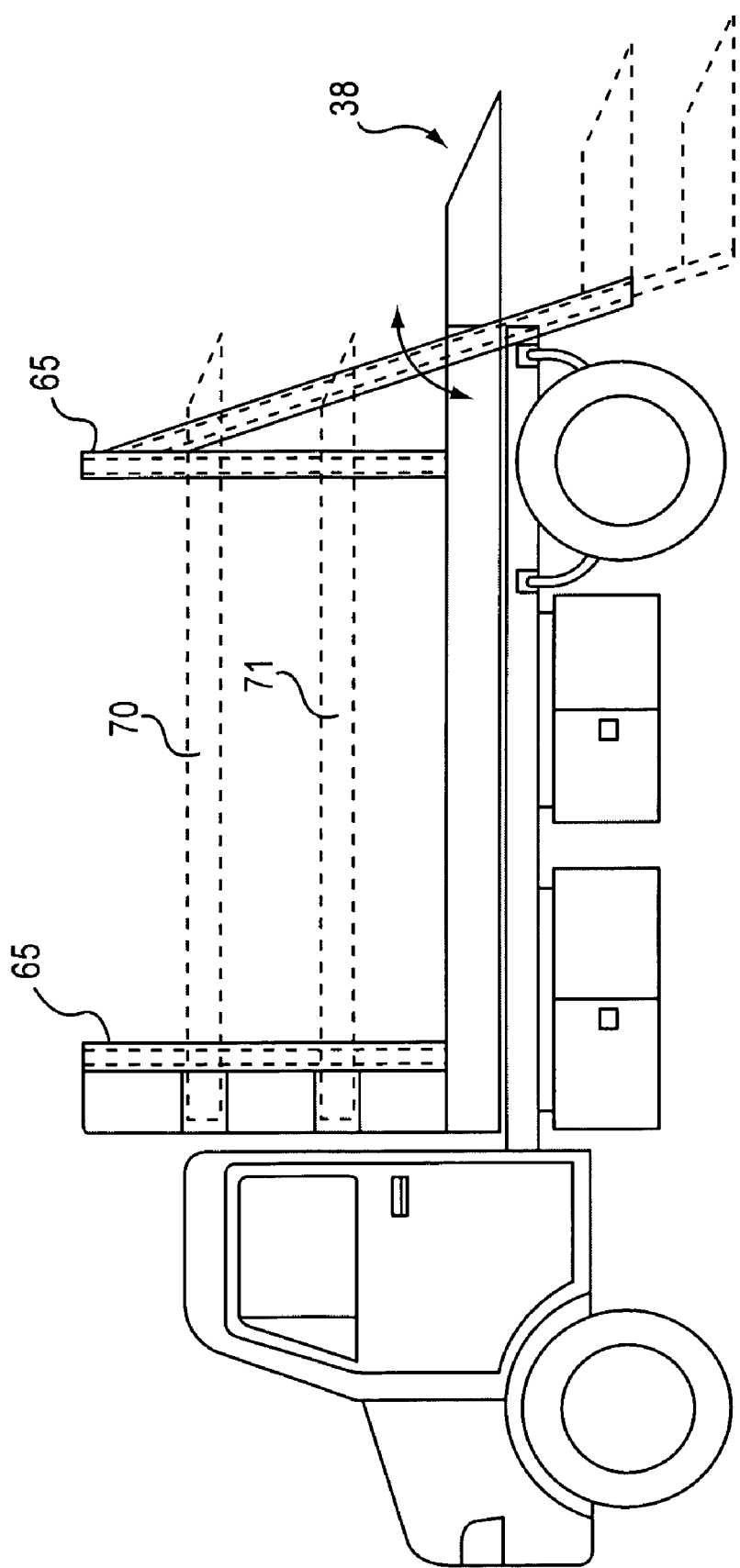
FIG. 7 is a pivoting diagrammatic view of a flat bed truck with the sliding deck according to the invention in combination with additional levels of decks for lateral storage.

FIG. 7 is a view of a flat bed truck with the sliding deck according to the invention with additional levels of decks for lateral storage. The additional laterally-disposed decks 70, 71 are positioned vertically by controlled elevator mechanisms in the interior of the upstanding fore and aft pairs of members 65. The sliding deck assembly as discussed in the beginning portion of this specification and is located aft of the vertically-displaceable platforms. For illustration, stages in the ascent and descent of the sliding deck 38 are shown in phantom outline.

FIG. 8 is a view similar to FIG. 7 showing the sliding deck 38 according to the invention on the rear of the flat bed of a truck, with an area 79 closely adjacent to the cab accommodating transversely-mounted storage areas for large, generally flat panels, such as automotive hoods and doors. The number of decks is one, labeled 70, 71 and 72 for various selected vertical positions. The area 79 is designed to receive flat panel members, such as door panels or hoods transversely loaded respectively into one of the six slots representatively shown. A lesser or greater number of slots can be chosen.

The invention as described is not intended as a retrofit for flat truck beds, but rather is primarily intended for use in combination with such fixed flat truck beds. However, the combination according to the invention is intended to be covered, so that reconstruction of an existing flat truck bed to add the sliding deck of the invention to make a combination that is equivalent to the disclosed combination is also within the contemplation of the invention.

Where the contemplated surface for loading or unloading is flat, such as limited use within a warehouse with a mini-vehicle, for example, alternatively the tower members could be fixed as disclosed in detail in the provisional application for which priority is claimed and its disclosure is incorporated by reference. It should be understood that the embodiment here mainly described with the pivoting tower members is a preferred embodiment, as between the two disclosed tower structures.

Because various changes could be made to the constructions providing for the various embodiments above without departing from the scope of the claimed invention, it is intended that all matter contained in the above description as shown in the accompanying drawings shall be interpreted as illustrative and not limiting so that the scope of the invention is defined in the appended claims.

What is claimed is:

1. A sliding deck assembly configured to supplement a fixed truck bed having a fixed deck with a loading surface, the sliding deck assembly comprising:

a pair of opposed inclined tower assemblies attached to the fixed deck, each having an outer tubular tower member attached to a rear portion of the fixed deck and configured to pivot about a pivot axis that is located along the rear portion of the fixed deck and substantially coplanar with the fixed deck, an inner telescoping channel member, and a hydraulic cylinder for extending or retracting the inner telescoping channel member relative to the outer tubular tower member, the outer tubular tower member defining a slot and being inclined at an angle offset from a direction perpendicular to the loading surface of the fixed deck;

a sliding deck configured for being raised and lowered along a path defined by said slot and said angle offset, said sliding deck having at least a pair of sliding deck side members, each of said pair respectively secured to said inner telescoping channel members, said sliding deck moving between a raised position and a lowered position along said path as a result of said extending or retracting of the inner telescoping channel members, and said sliding deck defining a sliding deck area that adds to the effective transporting area of said fixed deck when the sliding deck is in the raised position and wherein said sliding deck is connected to said tower members such that no relative rotation occurs between said towers and said sliding deck and supporting cylinders each supporting the outer tubular tower members each said supporting cylinder causing an extending or retracting for pivoting both the tubular tower members and the sliding deck about the pivot axis to cause a change in an angle of said sliding deck relative to a ground surface slope during loading or unloading of the sliding deck to accommodate the ground surface slope.

2. The sliding deck assembly as set forth in claim 1 wherein said sliding deck is sufficiently strong to accommodate loads in the sliding deck area while in transit.

3. The sliding deck assembly as set forth in claim 1, further including a door rack located on said fixed truck bed aft of a cab of said truck and forward of said sliding deck area, with a plurality of slots for receiving flat panel members.

4. The sliding deck assembly as set forth in claim 3, further including a plurality of generally horizontal racks supported at variably selected locations on a plurality of support posts at an area aft of said cab and forward of said sliding deck area.

5. The sliding deck assembly as set forth in claim 1, further including a pair of rear deck corner gussets respectively connecting said sliding deck side members and inner telescoping channel members to provide a fixed angular relationship between the sliding deck area and the inner telescoping channel members.

6. The sliding deck assembly as set forth in claim 1, wherein said supporting cylinders are generally vertically oriented when said outer tubular tower members are retracted and have a movable end connected to said outer tubular tower members.

7. The sliding deck assembly as set forth in claim 1, wherein said angle is from about zero degrees to about minus 15 degrees relative to a horizontal reference plane.

8. The sliding deck assembly as set forth in claim 1, wherein the angle offset is up to about 45 degrees.

9. The sliding deck assembly as set forth in claim 1, further comprising:

a retractable rear bumper integrated with the sliding deck assembly, which retracts into the bottom of said sliding deck when the sliding deck is lowered, and extends to a proper bumper position when the sliding deck is raised.

10. A sliding deck assembly including a sliding deck appended to a fixed truck bed having a fixed deck, and capable of being raised and lowered and tilted through a limited arc, said sliding deck assembly comprising:

a pair of opposed inclined tower assemblies attached to the fixed deck, each having an outer tubular tower member attached to a rear portion of the fixed deck and configured to pivot about a pivot axis that is located along the rear portion of the fixed deck and substantially coplanar with the fixed deck, an inner telescoping channel member, and a hydraulic cylinder for extending or retracting the inner telescoping channel member relative to the outer tubular tower member, the outer tubular tower member defining a slot and being inclined at an angle offset from a direction perpendicular to the loading surface of the fixed deck, wherein pivoting of the inclined tower assemblies by supporting cylinders secured to portions of said tubular outer members, defines said limited arc;

a sliding deck configured for being raised and lowered along a path defined by said slot and said angle offset, said sliding deck having at least a pair of sliding deck side members, each of said pair respectively secured to said inner telescoping channel members, said sliding deck moving between a raised position and a lowered position along said path as a result of said extending or retracting of said inner telescoping channel members to, and said sliding deck defining a sliding deck area that adds to the effective transporting area of said fixed deck when the sliding deck is in a raised position and wherein said sliding deck is connected to said towers such that no relative rotation occurs between said towers and said sliding deck and supporting cylinders each supporting the outer tubular tower members each said supporting cylinder causing an extending or retracting for pivoting both the tubular tower members and the sliding deck about the pivot axis to cause a change in an angle of said sliding deck relative to a ground surface slope during loading or unloading of the sliding deck to accommodate the ground surface slope.

11. The sliding deck assembly as set forth in claim 10 wherein said sliding deck area is sufficiently strong to accommodate loads in the sliding deck area while in transit.

12. The sliding deck assembly as set forth in claim 10, further including a door rack located on said fixed truck bed aft of a cab of said truck and forward of said sliding deck area, with a plurality of slots for receiving flat panel members.

13. The sliding deck assembly as set forth in claim 12, further including a plurality of generally horizontal racks supported at variably selected locations on a plurality of support posts at an area aft of said cab and forward of said sliding deck area.

14. The sliding deck assembly as set forth in claim 10, further including a pair of rear deck corner gussets respectively connecting said sliding deck side members and the inner telescoping channel members to provide a fixed angular relationship between the sliding deck area and the inner telescoping channel members.

15. The sliding deck assembly as set forth in claim 10, wherein said supporting cylinders are generally vertically oriented when said outer tubular tower members are retracted and have a movable end connected to said outer tubular tower members.

16. The sliding deck assembly as set forth in claim 10, wherein said angle is from about zero degrees to about minus 15 degrees relative to a horizontal reference plane.

17. The sliding deck assembly as set forth in claim 10, wherein the angle offset is up to about 45 degrees.

18. The sliding deck assembly as set forth in claim 10, further comprising:

a retractable rear bumper integrated with the sliding deck assembly, which retracts into the bottom of said sliding deck when the sliding deck is lowered, and extends to a proper bumper position when the sliding deck is raised.

* * * * *